(12) United States Patent
Takahashi (10) Patent No.: US 10,999,532 B2
(45) Date of Patent: May 4, 2021

(54) VEHICLE RECORDING DEVICE, VEHICLE RECORDING METHOD AND NON-TRANSITORY COMPUTER READABLE MEDIUM

(71) Applicant: JVCKENWOOD Corporation, Kanagawa (JP)

(72) Inventor: Hiroki Takahashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/856,741

(22) Filed: Apr. 23, 2020

(65) Prior Publication Data

US 2020/0252556 A1   Aug. 6, 2020

Related U.S. Application Data

(63) Continuation of application No. PCT/JP2018/040668, filed on Nov. 1, 2018.

(30) Foreign Application Priority Data

Mar. 2, 2018   (JP) .............................. JP2018-037253

(51) Int. Cl.
*H04N 5/262*   (2006.01)
*B60R 1/00*   (2006.01)
(Continued)

(52) U.S. Cl.
CPC ............. *H04N 5/2628* (2013.01); *B60R 1/00* (2013.01); *H04N 5/272* (2013.01); *H04N 5/77* (2013.01);
(Continued)

(58) Field of Classification Search
CPC ................ B60R 1/00; B60R 2300/105; B60R 2300/607; B60R 2300/303; H04N 5/2628; H04N 5/272; H04N 5/77; H04N 7/188
See application file for complete search history.

(56) References Cited

U.S. PATENT DOCUMENTS

| 10,239,456 B1 * | 3/2019 | Tao ........................... B60R 1/00 |
| 2003/0197660 A1 * | 10/2003 | Takahashi .......... G06K 9/00791 |
| | | 345/7 |

(Continued)

FOREIGN PATENT DOCUMENTS

| CN | 104875681 A | 9/2015 |
| JP | 2000-128031 A | 5/2000 |

(Continued)

OTHER PUBLICATIONS

Translation of CN104875681A (Year: 9201).*

*Primary Examiner* — David E Harvey
(74) *Attorney, Agent, or Firm* — Procopio, Cory, Hargreaves & Savitch LLP (57) ABSTRACT

A vehicle recording device includes a video acquisition unit that acquires video of a first camera for shooting front or rear of a vehicle and video of a second camera for shooting a range including a lower part of a front, a rear, left and right of the vehicle, a cutout unit that performs cutout processing on the video of the second camera acquired by the video acquisition unit with a first cutout range to be used as an overhead video image and a second cutout range at least including an area in a direction further away from the vehicle than the first cutout range is, and a recording control unit that records the video of the second camera cut out with the second cutout range to be recorded when the vehicle is stopping, and record the video of the first camera to be recorded when the vehicle is moving.

5 Claims, 7 Drawing Sheets

(51) Int. Cl.
*H04N 5/272* (2006.01)
*H04N 5/77* (2006.01)
*H04N 7/18* (2006.01)
*B60R 1/12* (2006.01)

(52) U.S. Cl.
CPC .............. *H04N 7/188* (2013.01); *B60R 1/12* (2013.01); *B60R 2001/1253* (2013.01); *B60R 2300/105* (2013.01); *B60R 2300/60* (2013.01)

(56) References Cited

U.S. PATENT DOCUMENTS

| | | | | |
|---|---|---|---|---|
| 2006/0202984 | A1* | 9/2006 | Yang | G06T 5/006 345/419 |
| 2010/0245573 | A1* | 9/2010 | Gomi | H04N 7/181 348/148 |
| 2012/0314072 | A1* | 12/2012 | Kiyo | B60R 1/00 348/148 |
| 2013/0162830 | A1* | 6/2013 | Mitsuta | B60R 1/00 348/148 |
| 2014/0085466 | A1* | 3/2014 | Moriyama | G08G 1/165 348/148 |
| 2014/0112597 | A1* | 4/2014 | Yu | B60R 1/00 382/294 |
| 2014/0152774 | A1* | 6/2014 | Wakabayashi | G06T 3/005 348/46 |
| 2014/0176713 | A1* | 6/2014 | Ho | G02B 7/14 348/148 |
| 2014/0313335 | A1 | 10/2014 | Koravadi | |
| 2014/0347470 | A1* | 11/2014 | Zhang | B60R 1/00 348/118 |
| 2015/0217692 | A1 | 8/2015 | Yanagawa | |
| 2016/0165148 | A1* | 6/2016 | Itoh | H04N 5/247 348/148 |
| 2016/0182823 | A1* | 6/2016 | Murasumi | B60R 11/04 348/38 |
| 2018/0093613 | A1* | 4/2018 | Timoneda | H04N 7/181 |
| 2018/0178724 | A1* | 6/2018 | Hatakeyama | G06K 9/209 |
| 2018/0192005 | A1* | 7/2018 | Watanabe | H04N 7/181 |
| 2018/0322655 | A1* | 11/2018 | Nagai | G06T 7/74 |
| 2018/0354419 | A1* | 12/2018 | Choi | H04N 5/247 |
| 2019/0132555 | A1* | 5/2019 | Chu | G01S 17/931 |
| 2019/0248289 | A1* | 8/2019 | Ishihara | H04N 7/181 |
| 2019/0258251 | A1* | 8/2019 | Ditty | G05D 1/0274 |
| 2020/0042805 | A1* | 2/2020 | Satomi | G08G 1/16 |
| 2020/0086791 | A1* | 3/2020 | Hardy | G06T 5/005 |
| 2020/0114822 | A1* | 4/2020 | Choi | H04N 5/2628 |
| 2020/0118294 | A1* | 4/2020 | Nakao | B60R 11/04 |
| 2020/0137322 | A1* | 4/2020 | Yokota | G06K 9/00805 |

FOREIGN PATENT DOCUMENTS

| | | | |
|---|---|---|---|
| JP | 2007096496 A | * | 4/2007 |
| JP | 2008-305189 A | | 12/2008 |
| JP | 2009-205463 A | | 9/2009 |
| JP | 2011-250193 A | | 12/2011 |
| JP | 2014-134912 A | | 7/2014 |

* cited by examiner

VEHICLE RECORDING DEVICE, VEHICLE RECORDING METHOD AND NON-TRANSITORY COMPUTER READABLE MEDIUM

CROSS REFERENCE TO RELATED APPLICATION

This application is a Bypass Continuation of PCT/JP2018/040668 filed on Nov. 1, 2018, which is based upon and claims the benefit of priority from Japanese patent application No. 2018-037253, filed on Mar. 2, 2018, the disclosure of which is incorporated herein in its entirety by reference.

BACKGROUND

The present invention relates to a vehicle recording device, a vehicle recording method and a program.

A vehicle recording device such as a driving recorder is becoming popular today. The vehicle recording device records video data for a certain period of time before and after the occurrence of an event (the detection of acceleration due to an accident or the like) as event record data, and it generally records video in the forward or rearward direction. However, the occurrence of an event does not necessarily happen at the front or back, and a collision can occur from the side. Japanese Unexamined Patent Application Publication No. 2000-128031 discloses a driving recorder using an omnidirectional camera. Japanese Unexamined Patent Application Publication No. 2011-250193 discloses a driving recorder that performs recording by detection using sensors corresponding to a plurality of cameras mounted on a vehicle.

SUMMARY

However, in the driving recorder disclosed in Japanese Unexamined Patent Application Publication No. 2000-128031, the omnidirectional camera, which is a camera of the driving recorder, is placed inside a vehicle, and therefore video in the sideward or rearward direction is low in quality, and it is not possible to record sideward or rearward video which is clear enough to help verifying an accident. Further, in the driving recorder disclosed in Japanese Unexamined Patent Application Publication No. 2011-250193, it is necessary to place a vehicle recording device plurality of cameras for the driving recorder and sensors respectively corresponding to the plurality of cameras, which causes a significant increase in cost.

The present embodiment has been accomplished in view of the above-described background, and an object of the present invention is thus to provide a vehicle recording device capable of adequately recording video in all directions of a vehicle without a significant increase in cost.

A vehicle recording device according to an embodiment includes a video acquisition unit configured to acquire video of a first camera for shooting front or rear of a vehicle and video of a second camera for shooting a range including a lower part of a front, a rear, left and right of the vehicle, a motion state acquisition unit configured to acquire a motion state of the vehicle, a cutout unit configured to perform cutout processing on the video of the second camera acquired by the video acquisition unit with a first cutout range to be used as an overhead video image and a second cutout range at least including an area in a direction further away from the vehicle than the first cutout range is, and a recording control unit configured to record the video of the second camera cut out with the second cutout range as data to be recorded when the vehicle is stopping, and record the video of the first camera as data to be recorded when the vehicle is moving.

A vehicle recording method according to an embodiment includes a first step of acquiring video of a first camera for shooting front or rear of a vehicle and video of a second camera for shooting a range including a lower part of a front, a rear, left and right of the vehicle, a second step of performing cutout processing on the video of the second camera with a first cutout range to be used as an overhead video image and a second cutout range at least including an area in a direction further away from the vehicle than the first cutout range is, and a third step of recording the video of the second camera cut out with the second cutout range as data to be recorded when it is determined that the vehicle is stopping, and recording the video of the first camera as data to be recorded when it is determined that the vehicle is moving based on information related to a motion state of the vehicle.

A program according to an embodiment causes a computer to execute a process for vehicle recording, the program including a first processing step of acquiring video of a first camera for shooting front or rear of a vehicle and video of a second camera for shooting a range including a lower part of a front, a rear, left and right of the vehicle, a second processing step of performing cutout processing on the video of the second camera with a first cutout range to be used as an overhead video image and a second cutout range at least including an area in a direction further away from the vehicle than the first cutout range is, and a third processing step of recording the video of the second camera cut out with the second cutout range as data to be recorded when it is determined that the vehicle is stopping, and recording the video of the first camera as data to be recorded when it is determined that the vehicle is moving based on information related to a motion state of the vehicle.

According to this embodiment, it is possible to adequately record video in all directions of a vehicle without a significant increase in cost.

DETAILED DESCRIPTION

Although embodiments of the present invention are described hereinafter, the invention defined by the scope of the claims is not limited to the following embodiments. Further, not all of the elements described in the embodiments are essential as a solution to problem.

Figure 1:
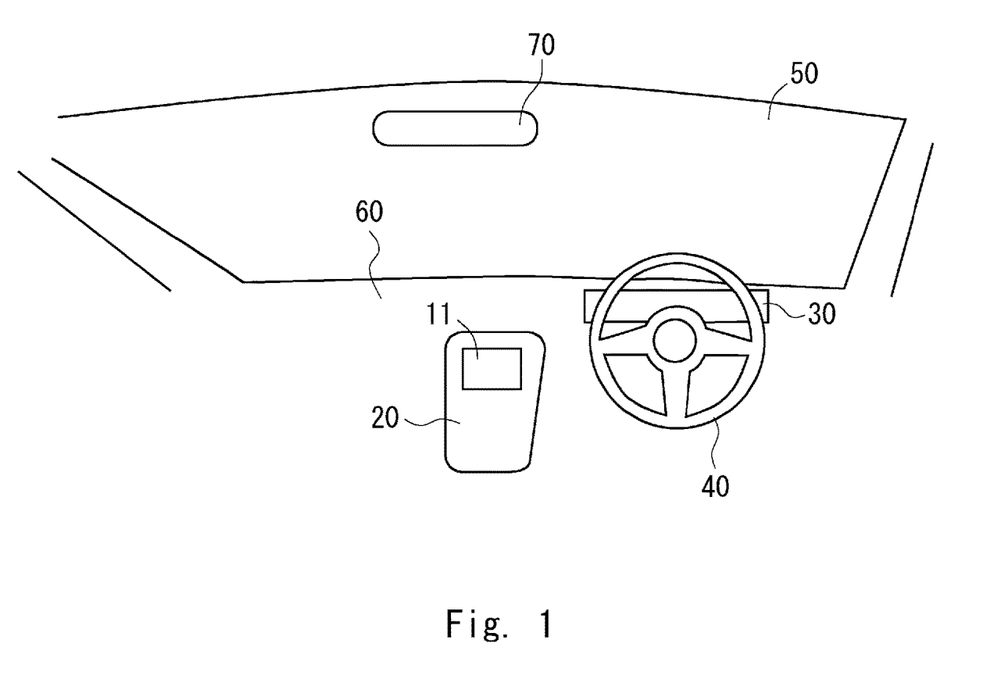
FIG. 1 is a view schematically showing an example of the front of the driver's seat in a vehicle on which a vehicle recording device according to this embodiment is mounted.

FIG. 1 is a view schematically showing an example of the front of the driver's seat in a vehicle on which a vehicle recording device according to this embodiment is mounted. In the vehicle shown in FIG. 1, an overhead video image is displayed on a horizontally oriented display unit 11 that is located on a center console 20. Further, on the front of the driver's seat in the vehicle shown in FIG. 1, an instrument panel 30, a steering wheel 40, a windshield 50, a dashboard 60, a rearview mirror 70 and the like are placed in addition to the display unit 11 and the center console 20.

The display unit 11 displays the above-described overhead video image and, before switching to the overhead video image, displays a navigation screen or the like. The steering wheel 40 is to be controlled by the driver. The steering direction of the vehicle is changed in accordance with the steering control using the steering wheel 40. The instrument panel 30 is placed on the dashboard 60 below the windshield 50, and a speedometer, a tachometer and the like are displayed thereon. The rearview mirror 70 is a mirror for the driver to check the area behind the vehicle.

Figure 2:
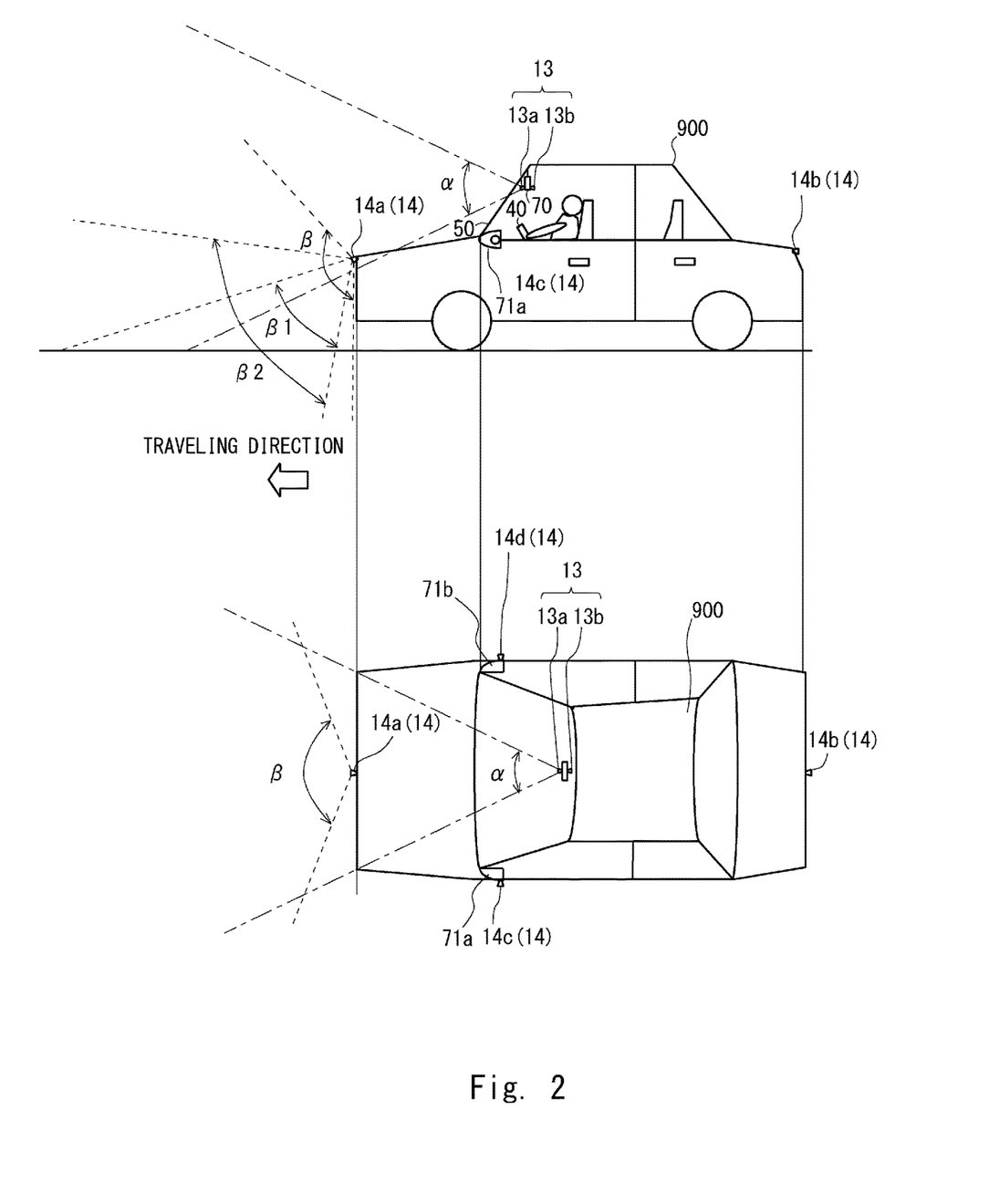
FIG. 2 is a schematic view showing an example of a position where a camera is placed in a vehicle on which the vehicle recording device according to this embodiment is mounted.

FIG. 2 is a schematic view showing an example of a position where a camera is placed in a vehicle on which the vehicle recording device according to this embodiment is mounted. The upper part of FIG. 2 shows a side view (left side view) of a vehicle 900, and the lower part of FIG. 2 shows a top view of the vehicle 900. As shown in FIG. 2, a first camera 13 and a second camera 14 are placed in the vehicle 900.

The first camera 13 is a camera for shooting the front or rear of the vehicle 900. The first camera 13 includes a forward camera 13a that shoots the front of the vehicle and a rearward camera 13b that shoots the rear of the vehicle. The forward camera 13a and the rearward camera 13b are placed in the upper part of the windshield, such as on the rearview mirror 70, for example. Note that a general driving recorder is equipped as standard with the first camera 13 including the forward camera 13a and the rearward camera 13b, which are placed inside the vehicle.

The second camera 14 is a camera for shooting the range including the lower part of the front, rear, left and right of the vehicle. Specifically, the second camera 14 includes a forward overhead video camera 14a that shoots the lower part of the front of the vehicle, a rearward overhead video camera 14b that shoots the lower part of the rear of the vehicle, a left side overhead video camera 14c that shoots the lower part of the left of the vehicle, and a right side overhead video camera 14d that shoots the lower part of the right of the vehicle. For example, the forward overhead video camera 14a is placed at the front end of the vehicle 900, the rearward overhead video camera 14b is placed at the rear end of the vehicle 900, the left side overhead video camera 14c is placed on a left side mirror 71a, and the right side overhead video camera 14d is placed on a right side mirror 71b. The forward overhead video camera 14a, the rearward overhead video camera 14b, the left side overhead video camera 14c and the right side overhead video camera 14d are wide angle lens cameras. Note that, a vehicle on which a vehicle camera system, so-called "surround view system", that shows video from various angles such as top view, rear view and panoramic view is mounted is equipped as standard with the second camera 14 including the forward overhead video camera 14a, the rearward overhead video camera 14b, the left side overhead video camera 14c and the right side overhead video camera 14d. Therefore, in a vehicle on which a surround view system is mounted, there is no need to additionally install the second camera 14.

The forward camera 13a and the rearward camera 13b included in the first camera 13 mainly include a lens, an image sensor, an AFE (analog front end) and the like. Likewise, the forward overhead video camera 14a, the rearward overhead video camera 14b, the left side overhead video camera 14c and the right side overhead video camera 14d included in the second camera 14 mainly include a lens, an image sensor, an AFE (analog front end) and the like.

The angle of view that can be captured by the forward camera 13a included in the first camera 13 is a specified angle of view α as indicated by the alternate long and short dashed lines, for example. Note that the field of view of the rearward camera 13b included in the first camera 13 is also a specified angle of view α, just like the field of view of the forward camera 13a. The angle of view that can be captured by the first camera 13 is the horizontal angle of view of 130° and the vertical angle of view of 70°, for example.

The angle of view that can be captured by the forward overhead video camera 14a included in the second camera 14 is a specified angle of view β as indicated by the dashed line, for example. A first cutout range in the video captured by the forward overhead video camera 14a is the range to be used as an overhead video image, and an example of the cutout range in the vertical direction is the range from the end of the vehicle to the position at a distance of about 2 m from the vehicle 900. A second cutout range is the range at least including an area in the direction away from the vehicle 900 compared with the first cutout range, and the cutout range in the vertical direction may be cut out wider than the first cutout range, or may be cut out at the vertical angle of view similar to the vertical angle of view of the first cutout range. Further, the second cutout range includes the area in the direction away from the vehicle 900 compared with the first cutout range, and preferably includes the area in the horizontal direction. In the upper part of FIG. 2, the vertical angle of view of the first cutout range is β1, for example. In the upper part of FIG. 2, the vertical angle of view of the second cutout range is β2, for example. Note that, in the rearward overhead video camera 14b, the left side overhead video camera 14c and the right side overhead video camera 14d included in the second camera 14 also, the vertical angle of view of the first cutout range is β1, and the vertical angle of view of the second cutout range is β2, just like the field of view of the forward overhead video camera 14a. The angle of view that can be captured by the second camera 14 is the horizontal angle of view of 180° and the vertical angle of view of 150°, for example. Further, the vertical angle of view of the first cutout range is 60°, and the vertical angle of view of the second cutout range is 100°, for example.

Figure 3:
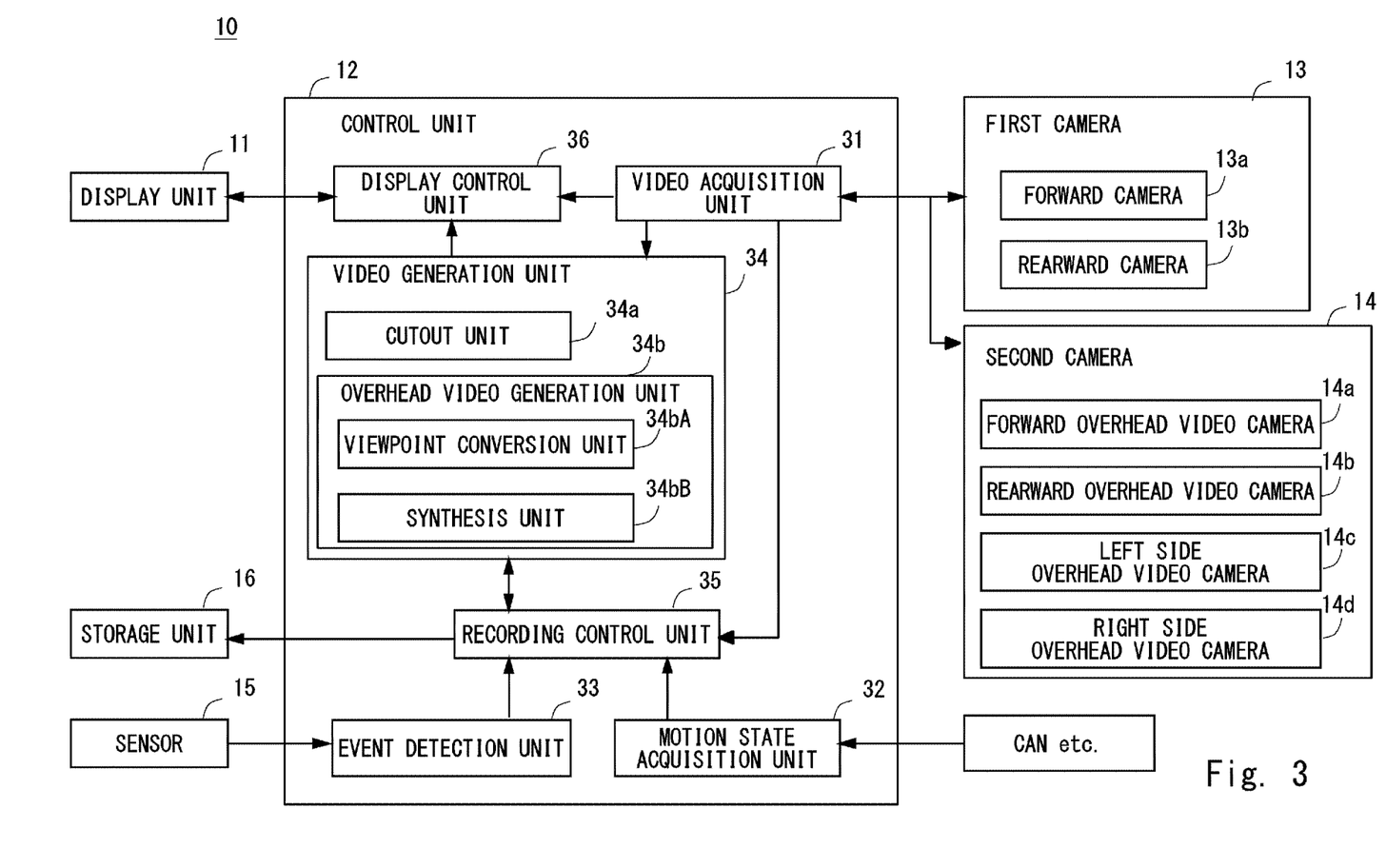
FIG. 3 is a block diagram showing a configuration example of the vehicle recording device according to this embodiment.

FIG. 3 is a block diagram showing a configuration example of a vehicle recording device 10 according to this embodiment. As shown in FIG. 3, the vehicle recording device 10 includes a display unit 11, a control unit 12, a first camera 13, a second camera 14, a sensor 15, and a storage unit 16.

The control unit 12 includes a video acquisition unit 31, a motion state acquisition unit 32, an event detection unit 33, a video generation unit 34, a recording control unit 35, and a display control unit 36. The elements of the control unit 12 may be composed of a processor or may be software or module whose processing is performed when a processor executes a program stored in a memory.

The video acquisition unit 31 acquires the video of the first camera 13 that shoots the front or rear of the vehicle and the video of the second camera 14 that shoots the range including the lower part of the front, rear, left and right of the vehicle. The video acquisition unit 31 is connected with the forward camera 13a and the rearward camera 13b included in the first camera 13 by wired or wireless. The video acquisition unit 31 is connected with the forward overhead video camera 14a, the rearward overhead video camera 14b, the left side overhead video camera 14c and the right side overhead video camera 14d included in the second camera 14 by wired or wireless.

The motion state acquisition unit 32 acquires the motion state of the vehicle. Specifically, the motion state acquisition unit 32 acquires various types of information including the motion state of the vehicle through a CAN (Controller Area Network). Further, the motion state acquisition unit 32 may acquire various types of information about the motion state from a speedometer, a tachometer and the like.

The event detection unit 33 detects the occurrence of an event concerning the vehicle. The event is an incident such as an accident related to of a subject vehicle. The event detection unit 33 detects an event by detecting an impact or the like received by the subject vehicle by the sensor such as an acceleration sensor. Upon detecting an event, the event detection unit 33 outputs a detection signal to the recording control unit 35.

The video generation unit 34 performs image processing on the video of the first camera 13 or the second camera 14 acquired by the video acquisition unit 31, and thereby processes it into video in a predetermined format. The video generation unit 34 includes a cutout unit 34a. The cutout unit 34a performs cutout processing on the video of the second camera 14 acquired by the video acquisition unit 31 with a first cutout range to be used as an overhead video image and a second cutout range which is wider than the first cutout range at least in the direction away from the vehicle.

The video generation unit 34 may further include an overhead video generation unit 34b that generates an overhead video image. The overhead video generation unit 34b includes a viewpoint conversion unit 34bA and a synthesis unit 34bB. The viewpoint conversion unit 34bA performs viewpoint conversion on the video of the second camera 14 after cutout processing by the cutout unit 34a. The synthesis unit 34bB performs synthesis of video after viewpoint conversion and thereby generates an overhead video image. The video generation unit 34 generates an overhead video image with the first cutout range when the vehicle is moving back, and generates an overhead video image with the second cutout range when the vehicle is stopping, for the video of the second camera 14 acquired by the video acquisition unit 31. Further, when the vehicle is moving forward, the video generation unit 34 generates video obtained by performing specified image processing on the video of the first camera 13 acquired by the video acquisition unit 31.

When it is determined that the vehicle is stopping based on information from the motion state acquisition unit 32, the recording control unit 35 uses the video of the second camera 14 cut out with the second cutout range as data to be recorded. When, on the other hand, it is determined that the vehicle is moving based on information from the motion state acquisition unit 32, the recording control unit 35 uses the video of the first camera 13 as data to be recorded. The determination as to whether the vehicle is stopping or moving is not limited to a criterion determining that the vehicle is stopping when the vehicle speed S=0 km/h and that the vehicle is moving when the vehicle speed S>0 km/h. It may be determined that the vehicle is stopping when the vehicle speed S is equal to or lower than a predetermined speed. For example, the determination may be made based on a criterion determining that the vehicle is stopping when the vehicle speed S≤5 km/h and that the vehicle is moving when the vehicle speed S>5 km/h. Further, when the event detection unit 33 detects an event, the recording control unit 35 records video data for a specified period of time before and after the detection of the event as event record data.

When the vehicle is moving back, the recording control unit 35 may display an overhead video image based on the video of the second camera 14 cut out with the first cutout range on the display unit 11 through the display control unit 36.

When the event detection unit 33 does not detect an event, the recording control unit 35 temporarily records video data in the storage unit 16. In other words, when the event detection unit 33 does not detect an event, the recording control unit 35 records video data in the storage unit 16 by loop recording (i.e., recording to be overwritten after the lapse of a certain period).

When the event detection unit 33 detects an event, the recording control unit 35 records video data in the storage unit 16 as event record data. The event record data is video data that can be used for accident situation investigation, evidence preservation and the like, and it is recorded distinctively from other video data. For example, the event record data may be recorded in the storage unit 16 as record data that is not allowed to be overwritten.

The storage unit 16 is a memory for recording video data. The storage unit 16 is a nonvolatile memory such as a flash memory, for example. Note that, when the storage unit 16 is a removable memory card, the vehicle recording device 10 needs to have a connection interface for connecting a memory card. The storage unit 16 may be another device that records video data through a communication line or the like.

The display control unit 36 controls the display unit 11 so that the display unit 11 displays the overhead video image or the like generated by the video generation unit 34. The display unit 11 is placed in front of the driver's seat in the vehicle, and it displays the video generated by the video generation unit 34. In the example of FIG. 1, the display unit 11 is placed on the center console 20. When the vehicle is moving back, the display control unit 36 displays an overhead video image based on the video of the second camera 14 cut out with the first cutout range on the display unit 11. When, on the other hand, the vehicle is stopping, the display control unit 36 displays an overhead video image based on the video of the second camera 14 cut out with the second cutout range on the display unit 11. A way of displaying an overhead video image based on the video of the second camera 14 is described later.

Figure 4:
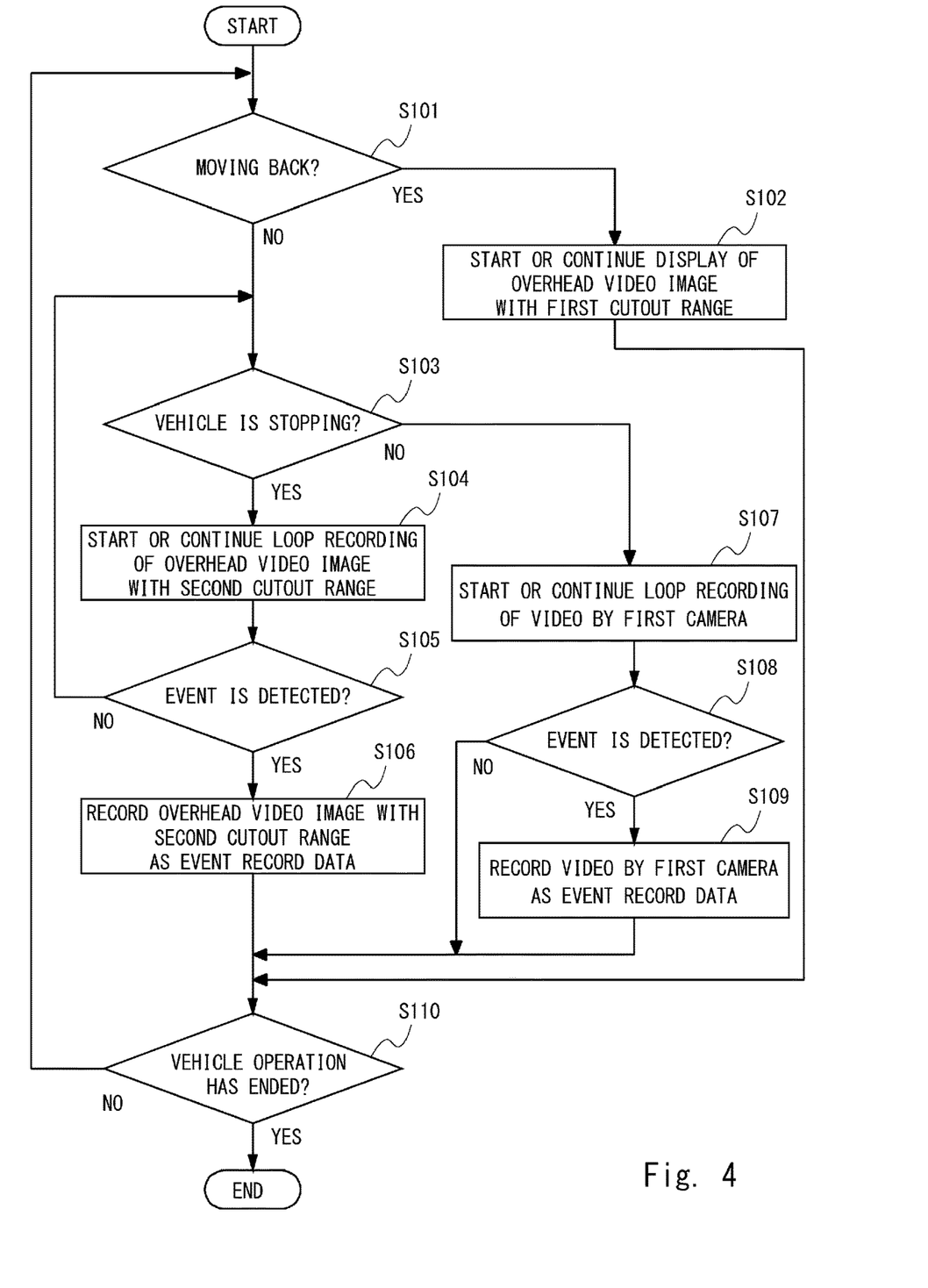
FIG. 4 is a flowchart showing the flow of a video recording operation in a control unit of the vehicle recording device according to this embodiment.

A video recording operation in the control unit 12 of the vehicle recording device 10 according to the first embodiment is described hereinafter. FIG. 4 is a flowchart showing the flow of a video recording operation in the control unit 12 of the vehicle recording device 10 according to this embodiment. As shown in FIG. 4, the recording control unit 35 first determines whether the vehicle is moving back or not (Step S101). It may be determined that the vehicle is moving back when the transmission is shifted in reverse, for example. When the vehicle is moving back (Yes) in Step S101, display of an overhead video image with the first cutout range on the display unit 11 is started or continued (Step S102), and the process proceeds to Step S110, which is described later. Specifically, when the vehicle is moving back, the recording control unit 35 gives an instruction to generate an overhead video image with the first cutout range to the video generation unit 34, and the display control unit 36 displays the overhead video image with the first cutout range generated by the video generation unit 34 on the display unit 11.

When the vehicle is not moving back (No) in Step S101, the recording control unit 35 determines whether the vehicle is stopping or not (Step S103). When it is determined that the vehicle is stopping (Yes) in Step S103, loop recording of the overhead video image with the second cutout range is started or continued (Step S104). Specifically, the recording control unit 35 gives an instruction to generate an overhead video image with the second cutout range to the video generation unit 34, and loop records the overhead video image with the second cutout range generated by the video generation unit 34 into the storage unit 16.

After Step S104, the recording control unit 35 determines whether an event is detected in the event detection unit 33 (Step S105). When an event is detected (Yes) in Step S105, the recording control unit 35 records the overhead video image with the second cutout range as event record data (Step S106). When, on the other hand, an event is not detected (No) in Step S105, the process returns to Step S103.

After Step S106, the recording control unit 35 determines whether the vehicle operation has ended or not (Step S110). When it is determined that the vehicle operation has ended (Yes) in Step S110, the process ends. When, on the other hand, it is determined that the vehicle operation has not ended (No) in Step S110, the process returns to Step S101.

When it is determined that the vehicle is not stopping (No) in Step S103, the recording control unit 35 starts or continues the loop recording of the video by the first camera (Step S107). Then, it is determined whether an event is detected or not (Step S108). When an event is detected (Yes) in Step S108, the recording control unit 35 records the video by the first camera as event record data (Step S109), and the process proceeds to Step S110. When, on the other hand, an event is not detected (No) in Step S108, the process proceeds to Step S110.

The way an overhead video image generated in the video generation unit 34 of the control unit 12 (see FIG. 3) for the video of the second camera 14 acquired by the video acquisition unit 31 is displayed on the display unit 11 is described hereinafter. As described above, the second camera 14 includes the forward overhead video camera 14a, the rearward overhead video camera 14b, the left side overhead video camera 14c and the right side overhead video camera 14d (see FIG. 2).

Figure 5:
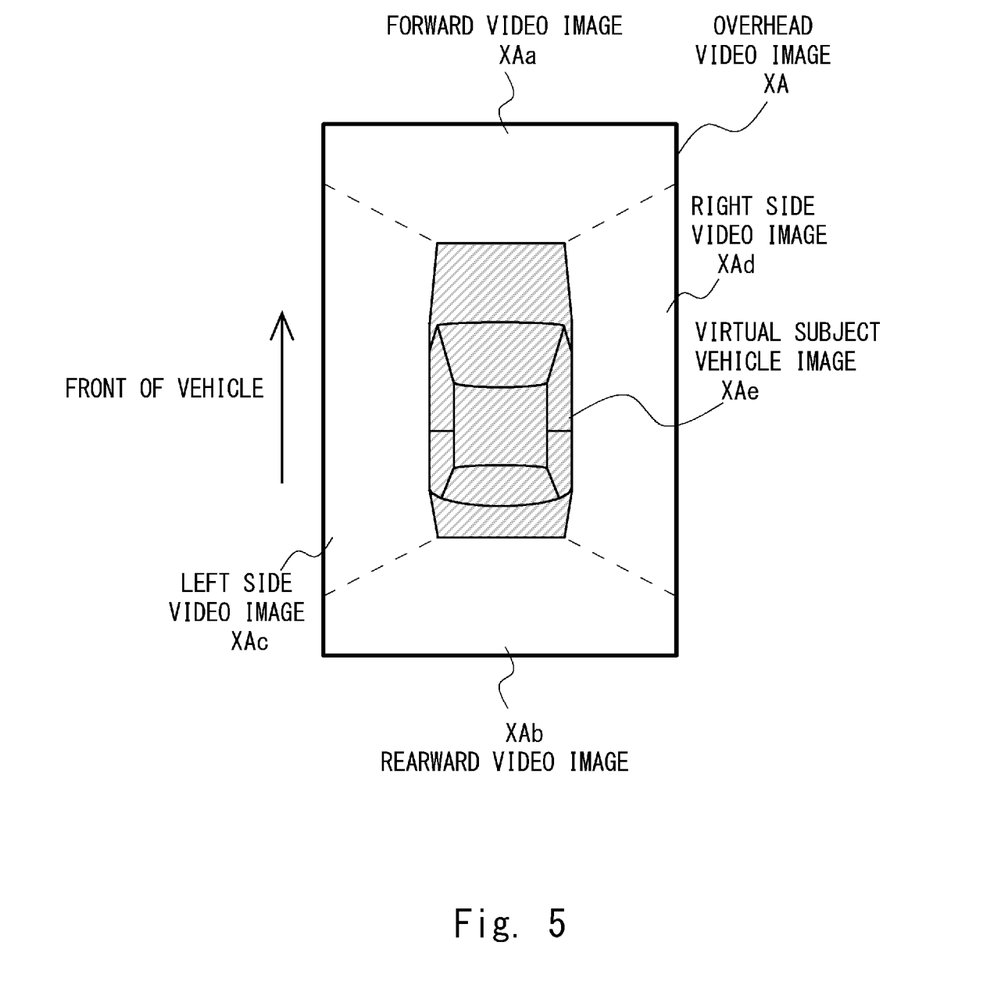
FIG. 5 is a schematic view showing an example in which an overhead video image generated for video data of a second camera is displayed on a display unit when a vehicle is moving back.

FIG. 5 is a schematic view showing an example in which an overhead video image generated for the video of the second camera 14 is displayed on the display unit 11 when the vehicle is moving back. As shown in FIG. 5, an overhead video image XA is displayed on the display unit 11 in such a way that a forward video image XAa is at the top, a rearward video image XAb is at the bottom, a left side video image XAc is on the left, and a right side video image XAd is on the right. The forward video image XAa is the first cutout range of the video of the forward overhead video camera 14a, and the rearward video image XAb is the first cutout range of the video of the rearward overhead video camera 14b. The left side video image XAc is the first cutout range of the video of the left side overhead video camera 14c, and the right side video image XAd is the first cutout range of the video of the right side overhead video camera 14d. Further, a virtual subject vehicle image XAe is displayed at the center of the overhead video image XA. In this manner, by displaying the video image showing the outside area of the vehicle on the display unit 11 when the vehicle is moving back, it is possible to assist the driver to handle the vehicle for parking.

Figure 6:
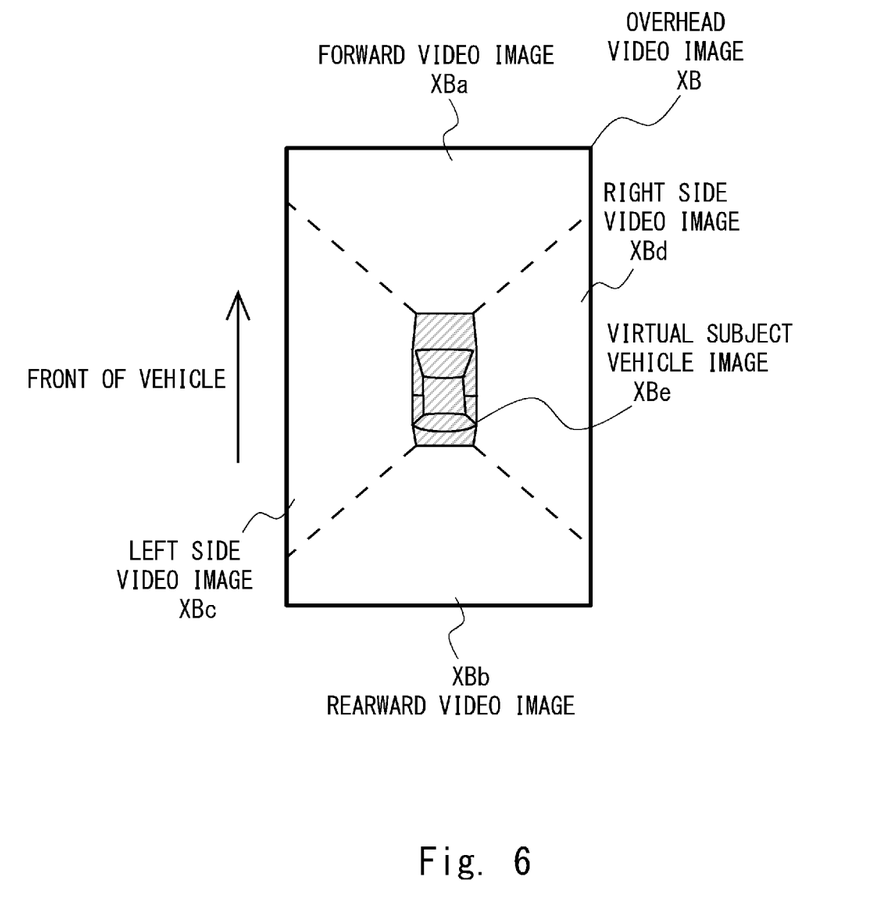
FIG. 6 is a schematic view showing an example in which an overhead video image generated for video data of the second camera is displayed on the display unit when a vehicle is stopping.

FIG. 6 is a schematic view showing an example in which an overhead video image generated for the video of the second camera 14 is displayed on the display unit 11 when the vehicle is stopping. As shown in FIG. 6, an overhead video image XB is displayed on the display unit 11 in such a way that a forward video image XBa is at the top, a rearward video image XBb is at the bottom, a left side video image XBc is on the left, and a right side video image XBd is on the right. The forward video image XBa is the second cutout range of the video of the forward overhead video camera 14a, and the rearward video image XBb is the second cutout range of the video of the rearward overhead video camera 14b. The left side video image XBc is the second cutout range of the video of the left side overhead video camera 14c, and the right side video image XBd is the second cutout range of the video of the right side overhead video camera 14d. Further, a virtual subject vehicle image XBe is displayed at the center of the overhead video image XB.

As described earlier with reference to FIG. 2, the forward overhead video camera 14a, the rearward overhead video camera 14b, the left side overhead video camera 14c and the right side overhead video camera 14d included in the second camera 14 are mounted on the outside of the vehicle. Therefore, the forward video image XBa, the rearward video image XBb, the left side video image XBc and the right side video image XBd when the vehicle is stopping are clear images. Further, a vehicle on which a surround view system is mounted is equipped as standard with the second camera 14 including the forward overhead video camera 14a, the rearward overhead video camera 14b, the left side overhead video camera 14c and the right side overhead video camera 14d. Therefore, when an event is detected while the vehicle is stopping, this overhead video image XB is recorded as event record data, and it is thereby possible to record video which is clear enough to help verifying an accident in all directions of a vehicle without a significant increase in cost.

Comparing the overhead video image XB in FIG. 6 with the overhead video image XA in FIG. 5, the forward video image XBa, the rearward video image XBb, the left side video image XBc and the right side video image XBd have a larger area than the forward video image XAa, the rearward video image XAb, the left side video image XAc and the right side video image XAd, respectively. This is because, in the case of the overhead video image XB shown in FIG. 6, each video data of the second camera 14 is cut out with the second cutout range, which is larger than the first cutout range at least in the direction away from the vehicle. Note that the virtual subject vehicle image XBe at the center of the overhead video image XB is smaller than the virtual subject vehicle image XAe at the center of the overhead video image XA.

Figure 7:
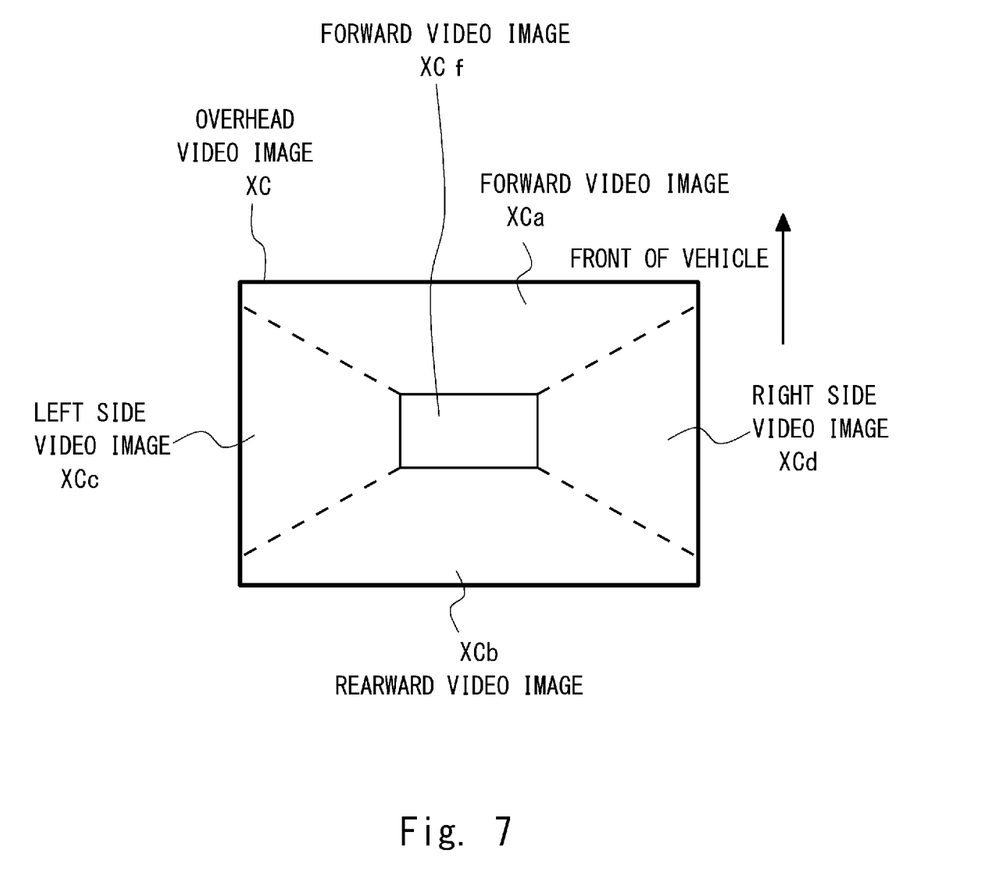
FIG. 7 is a schematic view showing another example in which an overhead video image generated for video data of the second camera is displayed on the display unit when a vehicle is stopping.

A composite image where the video image of the first camera 13 is superimposed at the center of the overhead video image generated by the synthesis unit 34bB may be generated in the video generation unit 34 (see FIG. 3) in the control unit 12. FIG. 7 is a schematic view showing another example in which an overhead video image generated for the video of the second camera 14 is displayed on the display unit 11 when the vehicle is stopping. As shown in FIG. 7, an overhead video image XC is displayed on the display unit 11 in such a way that a forward video image XCa is at the top, a rearward video image XCb is at the bottom, a left side video image XCc is on the left, and a right side video image XCd is on the right. The cutout ranges of the respective video are cut out and combined so that they form a horizontally long overhead video image. The forward video image XCa is the second cutout range of the video of the forward overhead video camera 14a, and the rearward video image XCb is the second cutout range of the video of the rearward overhead video camera 14b. The left side video image XCc is the second cutout range of the video of the left side overhead video camera 14c, and the right side video image XCd is the second cutout range of the video of the right side overhead video camera 14d. Further, a forward video image XCf or a rearward video image XCg, or the forward video image XCf and the rearward video image XCg, are superimposed at the center of the overhead video image XC, for example. When an event is detected while the vehicle is stopping, this overhead video image XC is recorded as event record data, and thereby the video of the second camera 14 is recorded in addition to the video of the first camera 13, and it is thus possible to record video which is more useful for verifying an accident. Although the overhead video image XC is a horizontally long overhead video image in FIG. 7 because the forward video image XCf, which is the video of the first camera 13, is horizontally long video data, it may be a vertically long overhead video image just like in FIG. 6.

The effects of the present invention described above are specifically described hereinafter. An event that occurs while the vehicle is moving can be recorded mostly with the video captured by the first camera 13. For example, even when another vehicle coming from the side collides with the side of the vehicle, this another vehicle before collision is within the shooting range of the first camera 13 which is shooting in the traveling direction of the vehicle while the vehicle is moving. On the other hand, when another vehicle coming from the side collides with the side of the vehicle while the vehicle is stopping, this another vehicle is not recorded in the shooting range of the first camera 13. Further, only video immediately before collision by another vehicle is recorded in the case where the video of the second camera 14 is recorded as the first cutout range, which is the same as the overhead video image displayed when the vehicle is moving back. In the present invention, the video captured by the first camera 13 is recorded while the vehicle is moving, and the video captured by the second camera 14, which is the video of the second cutout range, is recorded while the vehicle is stopping, which makes it possible to record the situation of an event appropriately upon occurrence of the event.

It should be noted that the present invention is not restricted to the above-described embodiments, and various changes and modifications may be made without departing from the scope of the invention.

Processing in each part of the vehicle recording device according to the present invention can be implemented by causing a computer or the like to execute a program. To be more specific, in the vehicle recording device, a program stored in a program memory is loaded to a main storage device, and this program is executed under control of a CPU. The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line. Further, the implementation of the process in each part in the vehicle recording device is not limited to software by a program. That is, it may be implemented by, for example, any combination of hardware, firmware, and software.

The present application can be used as a vehicle recording device for recording video data captured in a vehicle.

What is claimed is:

1. A vehicle recording device comprising:
   a video acquisition unit configured to acquire video of a first camera for shooting front or rear of a vehicle and video of a second camera for shooting a range including a lower part of a front, a rear, left and right of the vehicle;
   a motion state acquisition unit configured to acquire a motion state of the vehicle;
   a cutout unit configured to perform cutout processing with a first cutout range and a second cutout range on the video of the second camera acquired by the video acquisition unit, the first cutout range to be used as an overhead video image and the second cutout range at least including an area in a direction further away from the vehicle than the first cutout range is; and
   an overhead video generation unit configured to generate an overhead video image by performing viewpoint conversion and synthesis on the video of the second camera after cutout processing by the cutout unit;
   a recording control unit configured to record an overhead video image based on the video of the second camera cut out with the second cutout range as data to be recorded when the vehicle is stopping, and record the video of the first camera as data to be recorded when the vehicle is moving; and
   a display control unit configured to display the overhead video image based on the video of the second camera cut out with the first cutout range on a display unit when the vehicle is moving back.

2. The vehicle recording device according to claim 1, further comprising:
   an event detection unit configured to detect an event concerning the vehicle,
   wherein, when the event detection unit detects an event, the recording control unit records the video of the first camera as event record data when the vehicle is moving, and records the video of the second camera cut out with the second cutout range as event record data when the vehicle is stopping.

3. The vehicle recording device according to claim 1, wherein the overhead video generation unit generates a video image where the video of the first camera is superimposed at the center of the generated overhead video image.

4. A vehicle recording method comprising:
a first step of acquiring video of a first camera for shooting front or rear of a vehicle and video of a second camera for shooting a range including a lower part of a front, a rear, left and right of the vehicle;
a second step of performing cutout processing on the video of the second camera with a first cutout range to be used as an overhead video image and a second cutout range at least including an area in a direction further away from the vehicle than the first cutout range is;
a third step of generating an overhead video image by performing viewpoint conversion and synthesis on the video of the second camera after cutout processing;
a fourth step of recording the video of the second camera cut out with the second cutout range as data to be recorded when it is determined that the vehicle is stopping, and recording the video of the first camera as data to be recorded when it is determined that the vehicle is moving based on information related to a motion state of the vehicle; and
a fifth step of displaying the overhead video image based on the video of the second camera cut out with the first cutout range on a display unit when the vehicle is moving back.

5. A non-transitory computer readable medium storing recording control program for vehicles causing a computer to perform:
a first processing step of acquiring video of a first camera for shooting front or rear of a vehicle and video of a second camera for shooting a range including a lower part of a front, a rear, left and right of the vehicle;
a second processing step of performing cutout processing on the video of the second camera with a first cutout range to be used as an overhead video image and a second cutout range at least including an area in a direction further away from the vehicle than the first cutout range is;
a third processing step of generating an overhead video image by performing viewpoint conversion and synthesis on the video of the second camera after cutout processing;
a fourth processing step of recording the video of the second camera cut out with the second cutout range as data to be recorded when it is determined that the vehicle is stopping, and recording the video of the first camera as data to be recorded when it is determined that the vehicle is moving based on information related to a motion state of the vehicle; and
a fifth processing step of displaying the overhead video image based on the video of the second camera cut out with the first cutout range on a display unit when the vehicle is moving back.

\* \* \* \* \*